US009236756B2

(12) United States Patent
Jenwatanavet et al.

(10) Patent No.: US 9,236,756 B2
(45) Date of Patent: Jan. 12, 2016

(54) APPARATUS FOR WIRELESS DEVICE CHARGING USING RADIO FREQUENCY (RF) ENERGY AND DEVICE TO BE WIRELESSLY CHARGED

(75) Inventors: Jatupum Jenwatanavet, San Diego, CA (US); Ernest T. Ozaki, Poway, CA (US); Zhen Ning Low, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 637 days.

(21) Appl. No.: 13/481,826

(22) Filed: May 26, 2012

(65) Prior Publication Data

US 2013/0141037 A1    Jun. 6, 2013

Related U.S. Application Data

(60) Provisional application No. 61/566,894, filed on Dec. 5, 2011.

(51) Int. Cl.
| | | |
|---|---|---|
| *H02J 7/00* | (2006.01) | |
| *H02J 7/02* | (2006.01) | |
| *H02J 5/00* | (2006.01) | |
| *H02J 17/00* | (2006.01) | |

(52) U.S. Cl.
CPC ............. *H02J 7/025* (2013.01); *H02J 5/005* (2013.01); *H02J 17/00* (2013.01)

(58) Field of Classification Search
CPC ........................................ H02J 7/025
USPC ........................................ 320/108
See application file for complete search history.

(56) References Cited

U.S. PATENT DOCUMENTS

| 2,508,143 | A | * | 5/1950 | Burdett ........................ 318/772 |
| 4,379,988 | A | | 4/1983 | Mattatall |
| 4,873,677 | A | * | 10/1989 | Sakamoto et al. ............ 368/204 |

(Continued)

FOREIGN PATENT DOCUMENTS

| DE | 102004059006 A1 | 6/2006 |
| EP | 0886363 A1 | 12/1998 |

(Continued)

OTHER PUBLICATIONS

International Search Report and Written Opinion—PCT/US2012/067739—ISA/EPO—May 29, 2013.

*Primary Examiner* — Samuel Berhanu
*Assistant Examiner* — Tarikh Rankine
(74) *Attorney, Agent, or Firm* — James T. Gutierrez

(57) ABSTRACT

An apparatus for wireless charging using radio frequency (RF) energy includes a first charger portion having first and second charging areas. The first and second charging areas are located in a common plane, each having at least one coil for wirelessly charging a charge-receiving device placed in proximity thereto. The coils include respective windings, which are wound in opposing directions, each coil being connected in series, each coil configured to charge at least one charge-receiving device. A second charger portion has a third charging area having at least one coil including a winding for wirelessly charging a charge-receiving device placed in proximity to the third charging area, the coil in the third charging area being connected in series with the coils in the first and second charging areas, the third charging area located in a plane that is orthogonal to the plane of the first and second charging areas.

11 Claims, 14 Drawing Sheets

(56) References Cited

U.S. PATENT DOCUMENTS

| | | | |
|---|---|---|---|
| 5,194,857 A * | 3/1993 | Gomez | 340/7.63 |
| 7,009,362 B2 * | 3/2006 | Tsukamoto et al. | 320/107 |
| 7,042,196 B2 * | 5/2006 | Ka-Lai et al. | 320/108 |
| 7,164,255 B2 * | 1/2007 | Hui | 320/108 |
| 7,211,986 B1 | 5/2007 | Flowerdew | |
| 7,872,445 B2 * | 1/2011 | Hui | 320/108 |
| 2005/0064918 A1 * | 3/2005 | Medhin | 455/575.2 |
| 2005/0156560 A1 * | 7/2005 | Shimaoka et al. | 320/107 |
| 2007/0195979 A1 | 8/2007 | Thomasson et al. | |
| 2008/0116847 A1 | 5/2008 | Loke et al. | |
| 2008/0205678 A1 * | 8/2008 | Boguslavskij et al. | 381/312 |
| 2009/0010462 A1 | 1/2009 | Ekchian et al. | |
| 2009/0322285 A1 | 12/2009 | Hautanen | |
| 2010/0289341 A1 | 11/2010 | Ozaki et al. | |
| 2011/0018360 A1 * | 1/2011 | Baarman et al. | 307/104 |
| 2012/0025602 A1 * | 2/2012 | Boys et al. | 307/9.1 |
| 2013/0063084 A1 * | 3/2013 | Tilvis et al. | 320/108 |

FOREIGN PATENT DOCUMENTS

| | | | | |
|---|---|---|---|---|
| EP | 1096639 A1 | | 5/2001 | |
| FI | 20105493 | * | 5/2010 | 320/108 |

* cited by examiner

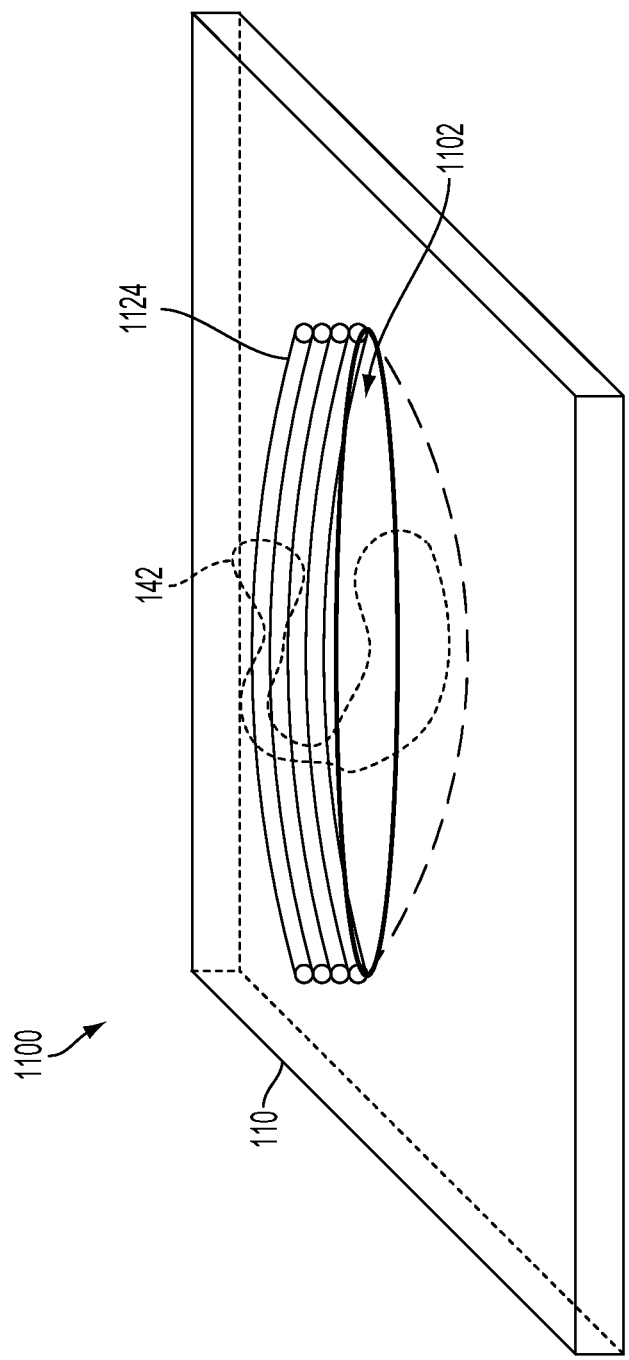

APPARATUS FOR WIRELESS DEVICE CHARGING USING RADIO FREQUENCY (RF) ENERGY AND DEVICE TO BE WIRELESSLY CHARGED

CROSS-REFERENCE TO RELATED APPLICATIONS

This application claims priority to, and the benefit of, U.S. Provisional Patent application No. 61/566,894, filed Dec. 5, 2011, entitled "APPARATUS FOR WIRELESS DEVICE CHARGING USING RADIO FREQUENCY (RF) ENERGY AND DEVICE TO BE WIRELESSLY CHARGED," the entire disclosure of which is hereby incorporated into this document by reference.

DESCRIPTION OF THE RELATED ART

Portable communication devices, such as cellular telephones, are frequently used with wireless headsets, and other small form factor devices. Further, it is envisioned that there are applications for portable communication devices that will distribute the functionality of a portable cellular telephone over smaller devices. One such application is the use of a small, wrist-worn device that can be paired with a wireless headset or earpiece to function as a portable cellular telephone. Other device functionality, such as GPS-based location and navigation, and other functionality can also be incorporated into the wrist-worn device. A common requirement for each of these devices is that they are typically powered by a small, rechargeable power source, such as a rechargeable battery. Under normal operating conditions, the rechargeable battery must be frequently recharged. One manner of recharging the battery is to use a wired charger that requires a household alternating-current (AC) source to supply the charging energy directly to the device. One problem with a wired charging arrangement is that the device to be charged must include a connector port to which a corresponding connector on the charger is connected. Such connectors require physical space, and make it difficult to seal the enclosure of the device to provide a watertight or water resistant package.

It would be desirable for charging to occur without the need for a wired connection. Further, wireless charging allows a device to be manufactured without an external charging connection, which facilitates the fabrication of a watertight or water resistant package. Wireless charging also provides freedom of movement for the user and allows multiple devices to be charged simultaneously. Examples of devices that may benefit from a wireless charging connection include, but are not limited to, a wireless headset, a multiple-function wristwatch, a wrist-worn display or other wrist-worn device, a hearing aid, an electronic earpiece, or other devices.

SUMMARY

An apparatus for wireless device charging using radio frequency (RF) energy and a device to be wirelessly charged are described. In an embodiment, an apparatus for wireless charging using radio frequency (RF) energy includes a first charger portion having first and second charging areas. The first and second charging areas are located in a common plane, the first and second charging areas each having at least one coil for wirelessly charging a charge-receiving device placed in proximity to any of the first and second charging areas. The at least one coil in each of the first and second charging areas includes a respective winding, the winding of the coil in the first charging area being wound in a direction opposite that of the winding of the coil in the second charging area, each coil being connected in series, each coil configured to charge at least one charge-receiving device. A second charger portion has a third charging area, the third charging area having at least one coil including a winding for wirelessly charging a charge-receiving device placed in proximity to the third charging area, the coil in the third charging area being connected in series with the coils in the first and second charging areas, the third charging area located in a plane that is orthogonal to the plane of the first and second charging areas.

In an embodiment, a wrist-worn charge-receiving device includes an antenna coil adapted to receive radio frequency (RF) charging energy and a rechargeable power source coupled to the antenna coil, the antenna coil adapted to provide the RF charging energy to the rechargeable power source.

In an embodiment, an ear-worn charge-receiving device includes an antenna coil adapted to receive radio frequency (RF) charging energy and a rechargeable power source coupled to the antenna coil, the antenna coil adapted to provide the RF charging energy to the rechargeable power source.

In an embodiment, a charge-receiving device includes an antenna coil adapted to receive radio frequency (RF) charging energy, a rechargeable power source coupled to the antenna coil, the antenna coil adapted to provide the RF charging energy to the rechargeable power source and a ferrite magnetic material separating the antenna coil from a metal-containing assembly associated with the charge-receiving device.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 11 is a schematic diagram illustrating an embodiment of a portion of the wireless charger of FIG. 1A.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The apparatus for wireless device charging using RF energy can be incorporated into what is referred to as a "personal communications hub." A personal communications hub can include a communication device, a personal digital assistant, or another personal electronic communication device along with a wireless headset, earpiece, or other device. As an example, a personal communications hub may include a wrist-worn device that functions as a communication device and/or a display device and a wireless earpiece or headset that is wirelessly coupled to the wrist-worn device. The wireless earpiece or headset is used for audible communication. These devices are powered by rechargeable power sources, which are charged by a charging system or charging station. The charging system is also referred to as a wireless power transmitter.

Figure 1A:
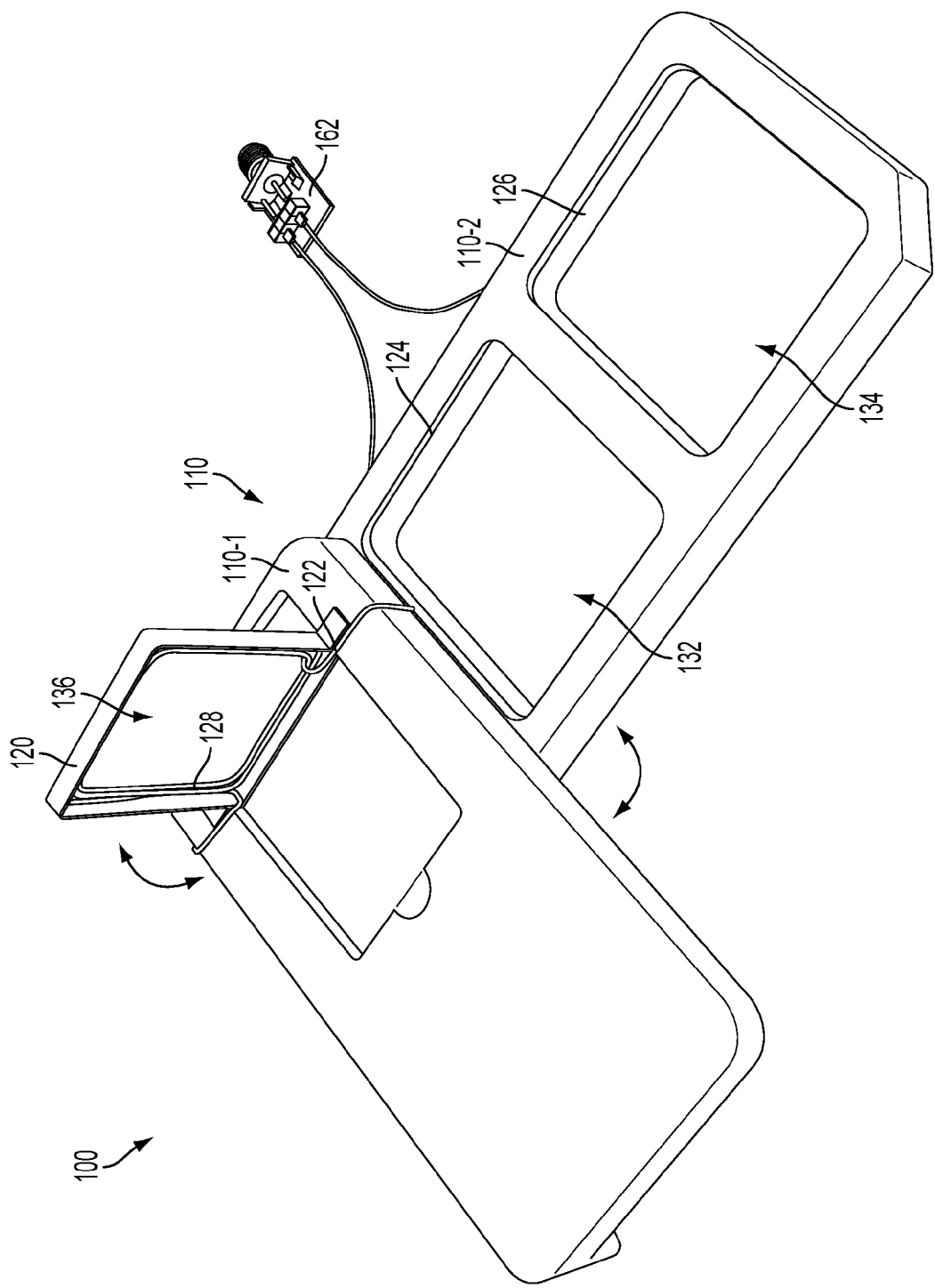
FIG. 1A is a schematic diagram illustrating a first embodiment of a wireless charger.

FIG. 1A is a schematic diagram illustrating a first embodiment of a wireless charger 100. The wireless charger 100 comprises a first charger portion 110 and a second charger portion 120. In an embodiment, the first charger portion 110 comprises a first element 110-1 and a second element 110-2, which may be movably coupled together, for instance, rotatably coupled together at a pivot axis (not shown). In an embodiment, the element 110-1 and the element 110-2 can rotate about the pivot point so they can be collapsed together or opened as shown in FIG. 1A.

In an embodiment, the element 110-2 of the first charger portion 110 may be adapted for charging ear-worn devices and the second charger portion 120 may be adapted for charging wrist-worn devices. The second charger portion 120 may be located adjacent to the element 110-1 of the first charger portion 110 using a hinge 122. The hinge 122 may allow the major axis of the second charger portion 120 to be rotated to a position that is substantially orthogonal to the major axis of the first charger portion 110.

The element 110-2 of the first charger portion 110 comprises a charging area 132 and a charging area 134. An antenna 124 is located proximate to the charging area 132 and an antenna 126 is located proximate to the charging area 134. In an embodiment, the charging area 132 and the charging area 134 comprise a recess or depression. In the embodiment shown in FIG. 1A, the antenna 124 surrounds the charging area 132 and the antenna 126 surrounds the charging area 134.

The second charger portion 120 comprises a charging area 136. An antenna 128 is located proximate to the charging area 136. In an embodiment, any of the antennas 124, 126 and 128 can be fabricated using conductive material, such as copper wire, to form a multiple-turn conductive coil into a cylindrical shape or into a planar shape or may be implemented as a printed structure, such as a printed coil formed on a flexible film. The device to be charged is placed in proximity to the appropriate antenna 124, 126 and 128, and charging occurs via RF energy coupling. In an embodiment, the antennas 124, 126 can be formed as cylindrical coils 152 and 154 (FIG. 1B), respectively, and the antenna 128 can be formed as a planar coil 156 (FIG. 1B), using a continuous length of conductive wire such that the antennas 124, 126 and 128 are all connected in series to provide higher efficiency for charging devices. Further, if desired, the antennas 124 and 126 be located as close to each other as possible to reduce the overall size of the wireless charger 100. Further, the windings of the cylindrical coil 152 can be wound in a direction opposite that of the windings of the cylindrical coil 154 to reduce interference between the coils.

Figure 1B:
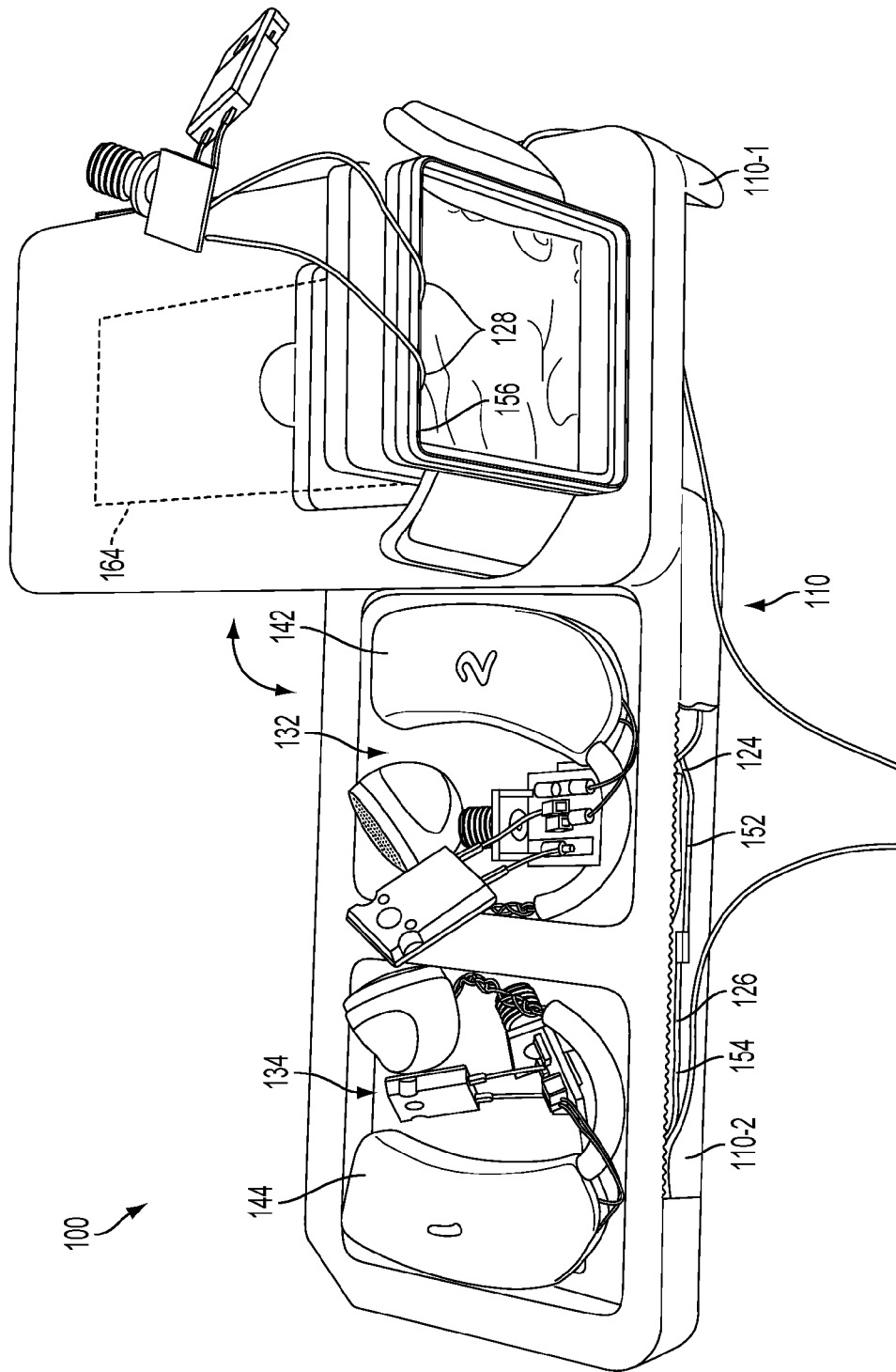
FIG. 1B is an alternative view of the wireless charger of FIG. 1A.

FIG. 1B is an alternative view of the wireless charger 100 of FIG. 1A. The illustration in FIG. 1B shows devices to be charged, which in this example are ear-worn devices 142 and 144, located in charging areas 132 and 134, respectively.

In an embodiment, a connector and circuit 162 (shown in FIG. 1A) supplies radio frequency (RF) charging energy to the antennas 124, 126 and 128. However, in alternative embodiments, the circuitry that delivers charging energy to the antennas 124, 126 and 128 can be located within the wireless charger 100 and there will be no external connector. In an embodiment, a circuit card assembly 164 can receive an externally generated RF signal and generate the charging energy. In another embodiment, DC power can be delivered to a circuit card assembly by, for example, a wall mounted AC-to-DC adaptor that supplies DC power from an AC source to, for example, a circuit card assembly 164, associated with the wireless charger 100. The circuit card assembly can receive the DC power and generate an RF signal at, for example, 6.78 MHz and supply the RF energy to the antennas 124, 126 and 128. In an embodiment, the multiple-turn cylindrical coils 152 and 154 for charging ear-worn devices are located in the horizontal plane (parallel to the plane of the ground) and the multiple-turn planar coil 156 for charging a wrist-worn device is located in the vertical plane (perpendicular to the plane of the ground). In an embodiment, and due to the orthogonal orientation of the second charger portion 120 with respect to the first charger portion 110, a circuit card assembly 164 can be mounted to the first charger portion 110 opposite the second charger portion 120 and not be subject to RF interference, or be subject to field degradation, as a result of its proximity to the second charger portion 120. The orthogonal orientation of a major surface of the antenna 128 with respect to a major surface of a circuit card assembly 164 reduces RF and inductive coupling from the antenna 128 to the circuit card assembly 164.

Using RF energy to provide the charging power allows a device to be charged to be placed within or adjacent the antennas 124, 126 and 128 without requiring a specific orientation. For example, the specific orientation of each ear-worn device 142 and 144 in each charging area 132 and 134 is not critical for charging to occur between the antenna 124 and the device 142, when, for instance, the ear-worn devices 142, 144 are located proximate to the charging areas 132, 134, respectively. The recess that forms the charging area 132 in proximity to which the antenna 124 is wound about a vertical wall of the recess aids in transferring charging energy from the antenna 124 to the ear-worn device 142. Similarly, the recess that forms the charging area 134 in proximity to which the antenna 126 is wound about a vertical wall of the recess aids in transferring charging energy from the antenna 126 to the ear-worn device 144.

Figure 2B:
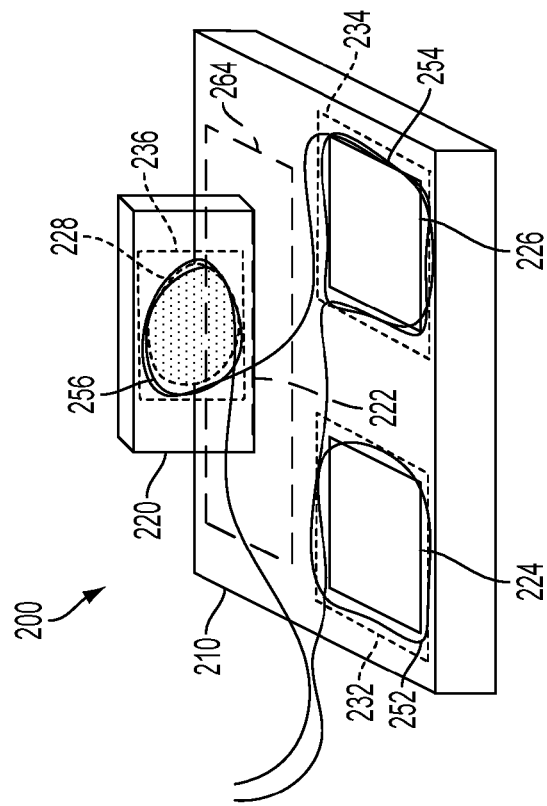
FIG. 2B illustrates an alternative view of the wireless charger of FIG. 2A.
Figure 2A:
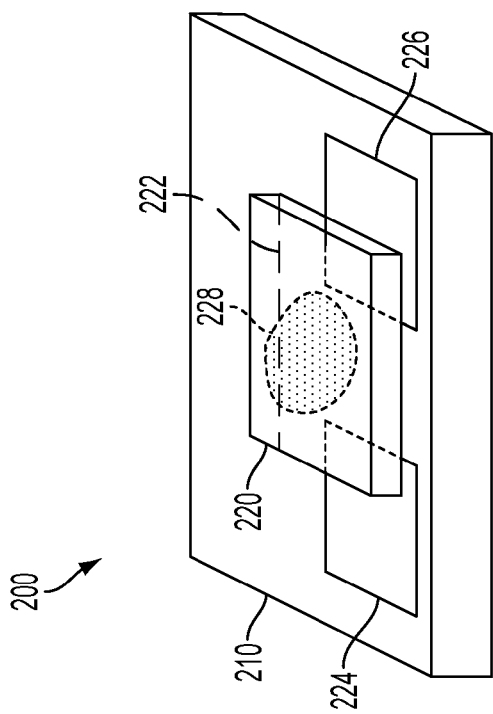
FIG. 2A is a schematic diagram illustrating a second embodiment of a wireless charger.

FIG. 2A is a schematic diagram illustrating a second embodiment of a wireless charger. The wireless charger 200 comprises a first charger portion 210 and a second charger portion 220. In an embodiment, the first charger portion 210 may be adapted for charging ear-worn devices and the second charger portion 220 may be adapted for charging wrist-worn devices. The second charger portion 220 may be located adjacent to the first charger portion 210 using a hinge 222. The hinge 222 may allow the major axis of the second charger portion 220 to be rotated to a position that is substantially orthogonal to the major axis of the first charger portion 210.

FIG. 2B illustrates an alternative view of the wireless charger of FIG. 2A. The wireless charger 200 shows the second charger portion 220 being rotated to a vertical position on the hinge 222 so that a major axis of the second charger portion 220 is substantially orthogonal to a major axis of the first charger portion 210.

The first charger portion 210 comprises a charging area 232 and a charging area 234. An antenna 224 is located proximate to the charging area 232 and an antenna 226 is located proximate to the charging area 234. In an embodiment, the charging area 232 and the charging area 234 comprise a recess or depression. In the embodiment shown in FIG. 2B, the antenna 224 surrounds the charging area 232 and the antenna 226 surrounds the charging area 234.

The second charger portion 220 comprises a charging area 236. An antenna 228 is located proximate to the charging area 236. In an embodiment, any of the antennas 224, 226 and 228 can be fabricated using conductive material, such as copper wire, to form a multiple-turn conductive coil into a cylindrical shape or into a planar shape or may be implemented as a printed structure, such as a printed coil formed on a flexible film. The device to be charged is placed in proximity to the appropriate antenna 224, 226 and 228, and charging may occur via RF energy coupling at a suitable frequency, for instance, approximately 6.78 MHz. In an embodiment, the antennas 224, 226 can be formed as cylindrical coils 252 and 254, respectively, and the antenna 228 can be formed as a planar coil 256, using a continuous length of conductive wire such that the antennas 224, 226 and 228 are all connected in series to provide higher efficiency for charging devices. Further, the windings of the cylindrical coil 252 are wound in a direction opposite that of the windings of the cylindrical coil 254 to reduce interference between the coils.

A connector and circuit (not shown in FIGS. 2A and 2B) supplies radio frequency (RF) charging energy to the antennas 224, 226 and 228. In an embodiment, the multiple-turn cylindrical coils 252 and 254 for charging ear-worn devices are located in the horizontal plane (parallel to the plane of the ground) and the multiple-turn planar coil 256 for charging a wrist-worn device is located in the vertical plane (perpendicular to the plane of the ground). In an embodiment, and due to the orthogonal orientation of the second charger portion 220 with respect to the first charger portion 210, a circuit card assembly 264 can be mounted to the first charger portion 210 opposite the second charger portion 220 and not be subject to RF interference, or be subject to field degradation, as a result of its proximity to the second charger portion 220. The orthogonal orientation of a major surface of the antenna 228 with respect to a major surface of a circuit card assembly 264 reduces RF and inductive coupling from the antenna 228 to the circuit card assembly 264.

As described above with respect to FIGS. 1A and 1B, using RF energy to provide the charging power allows a device to be charged to be placed within or adjacent the antennas 224, 226 and 228 without requiring a specific orientation.

Figure 3:
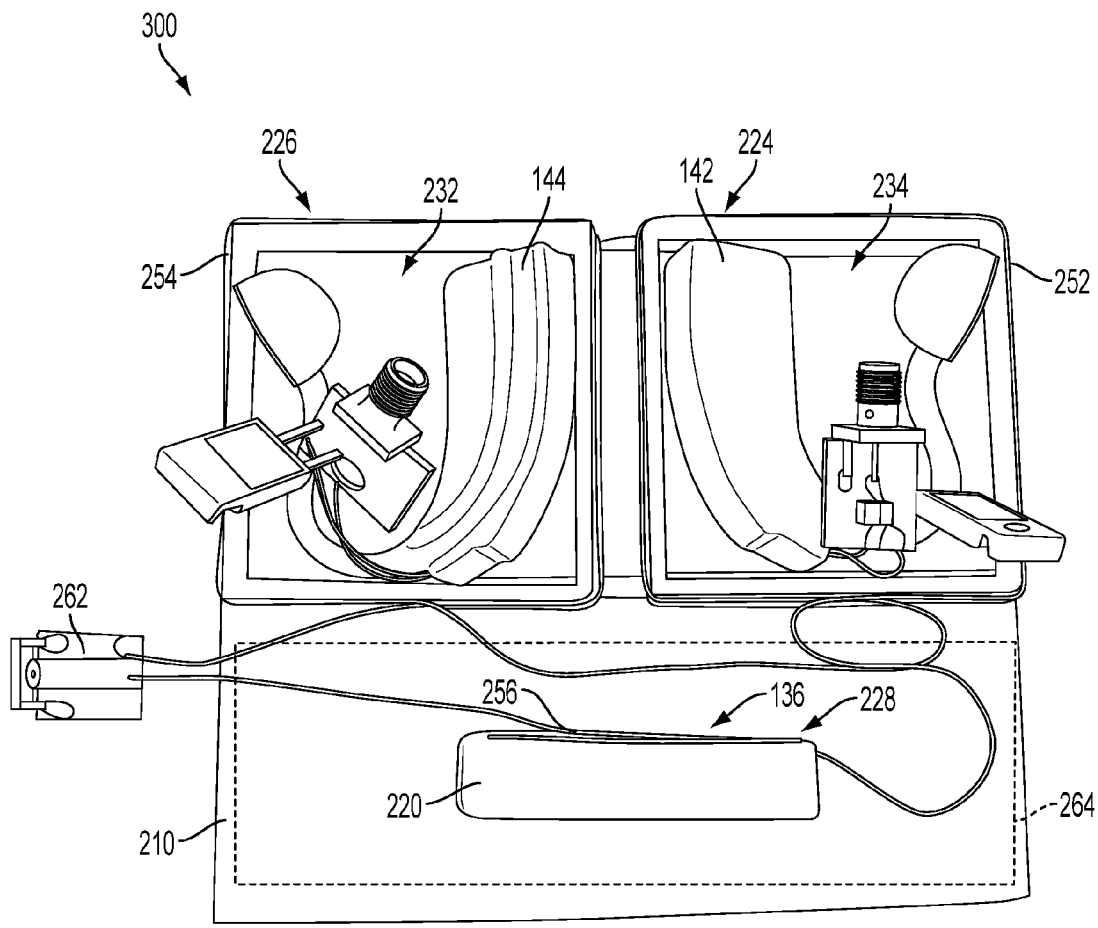
FIG. 3 is a schematic diagram illustrating a plan view of the wireless charger of FIGS. 2A and 2B.

FIG. 3 is a schematic diagram illustrating a plan view of the wireless charger of FIGS. 2A and 2B. In the embodiment shown in FIG. 3, the antennas 224 and 226 are implemented as cylindrical coils 252 and 254 and the antenna 228 is implemented as a planar coil 256. In an embodiment, the cylindrical coils 252 and 254 can be used to charge ear pieces 142 and 144 and the planar coil 256 can be used to charge a wrist-worn device (not shown). The design of each antenna 224, 226 and 228 comprises multiple-turn coils, which may be all connected in series to provide higher efficiency for charging devices. In an embodiment, the windings of the cylindrical coil 252 are wound in a direction opposite that of the windings of the cylindrical coil 254 to reduce interference between the coils.

In an embodiment, the cylindrical coils 252 and 254 comprise five turns of 26 AWG wire and are separated by approximately 5 millimeters (mm). The planar coil 256 can comprise five turns of 26 AWG wire and is located in a plane that is orthogonal to the plane in which the cylindrical coils 252 and 254 are located. In an embodiment, the area of each cylindrical coil 252 and 254 is approximately 50 mm×50 mm and the area of planar coil 256 is approximately 35 mm×40 mm.

A connector and circuit 262 supplies radio frequency (RF) charging energy to the antennas 224, 226 and 228. In an embodiment, the multiple-turn coils 252 and 254 for charging ear-worn devices are located in the horizontal plane (parallel to the plane of the ground) and the multiple-turn coil 256 for charging a wrist-worn device is located in the vertical plane (perpendicular to the plane of the ground). In an embodiment, and due to the orthogonal orientation of the second charger portion 220 with respect to the first charger portion 210, a circuit card assembly 264 can be mounted to the first charger portion 210 opposite the second charger portion 220 and not be subject to RF interference, or be subject to field degradation, as a result of its proximity to the second charger portion 220. The orthogonal orientation of a major surface of the antenna 228 with respect to a major surface of a circuit card assembly 264 reduces RF and inductive coupling from the antenna 228 to the circuit card assembly 264.

Using RF energy to provide the charging power allows a device to be charged to be placed within or adjacent the antennas 224, 226 and 228 without requiring a specific orientation.

Figure 4:
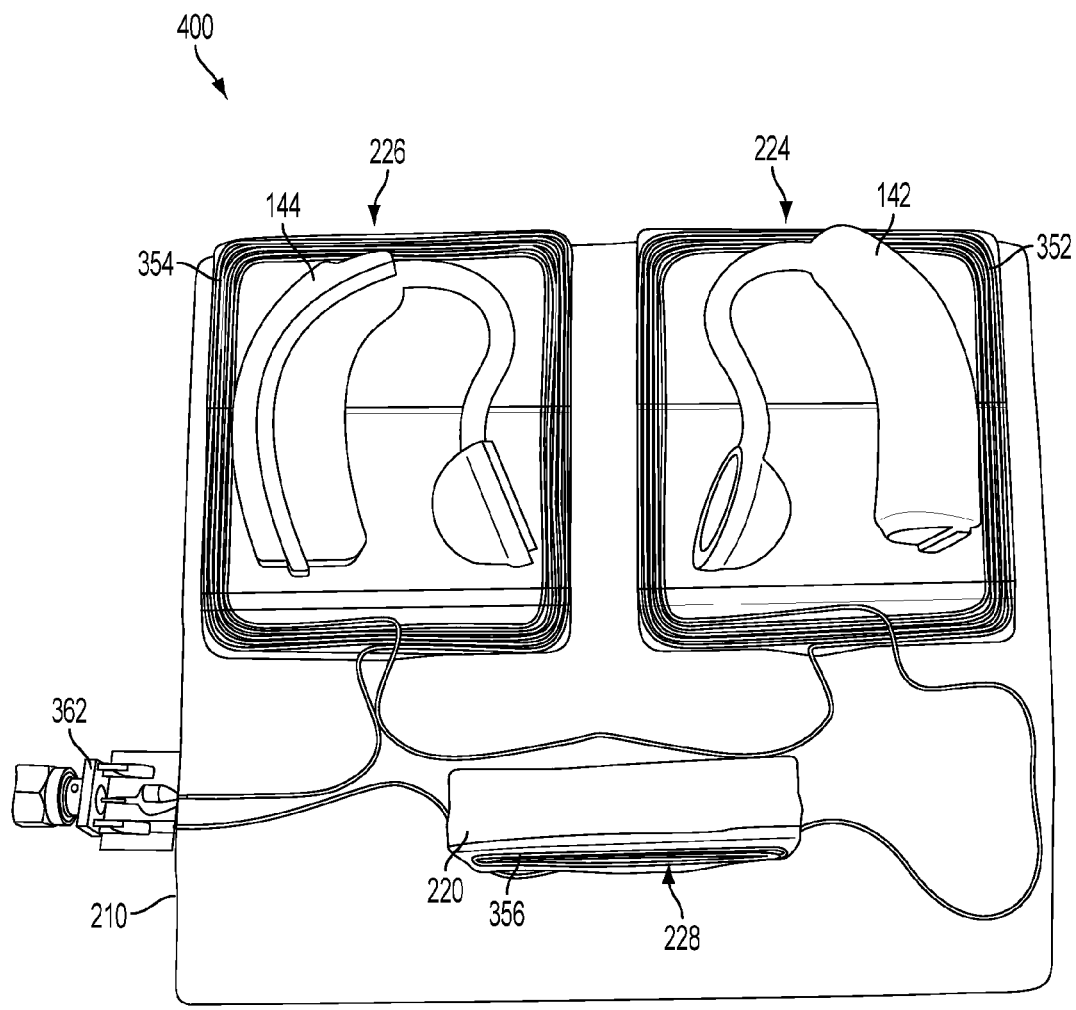
FIG. 4 is a schematic diagram illustrating an alternative embodiment of the wireless charger of FIG. 3.

FIG. 4 is a schematic diagram 400 illustrating an alternative embodiment of the wireless charger of FIG. 3. The wireless charger 400 comprises antennas 224 and 226 implemented as planar coils 352 and 354 and the antenna 228 implemented as a planar coil 356. The design of each antenna 224, 226 and 228 comprises multiple-turn coils, which are all connected in series to provide higher efficiency for charging devices. In an embodiment, the windings of the planar coil 352 are wound in a direction opposite that of the windings of the planar coil 354 to reduce interference between the coils.

In an embodiment, the planar coils 352 and 354 comprise five turns of 26 AWG wire and are separated by approximately 12 millimeters (mm). The planar coil 356 can comprise five turns of 26 AWG wire and is located in a plane that is orthogonal to the plane in which the cylindrical coils 352 and 354 are located. In an embodiment, the area of each planar coil 352 and 354 is approximately 49 mm×57 mm and the area of planar coil 356 is approximately 35 mm×40 mm.

A connector and circuit 362 supplies RF charging energy to the antennas 224, 226 and 228. In an embodiment, the planar coils 352 and 354 can be used to charge ear-worn devices 142 and 144 and the planar coil 356 can be used to charge a wrist-worn device (not shown).

Figure 5:
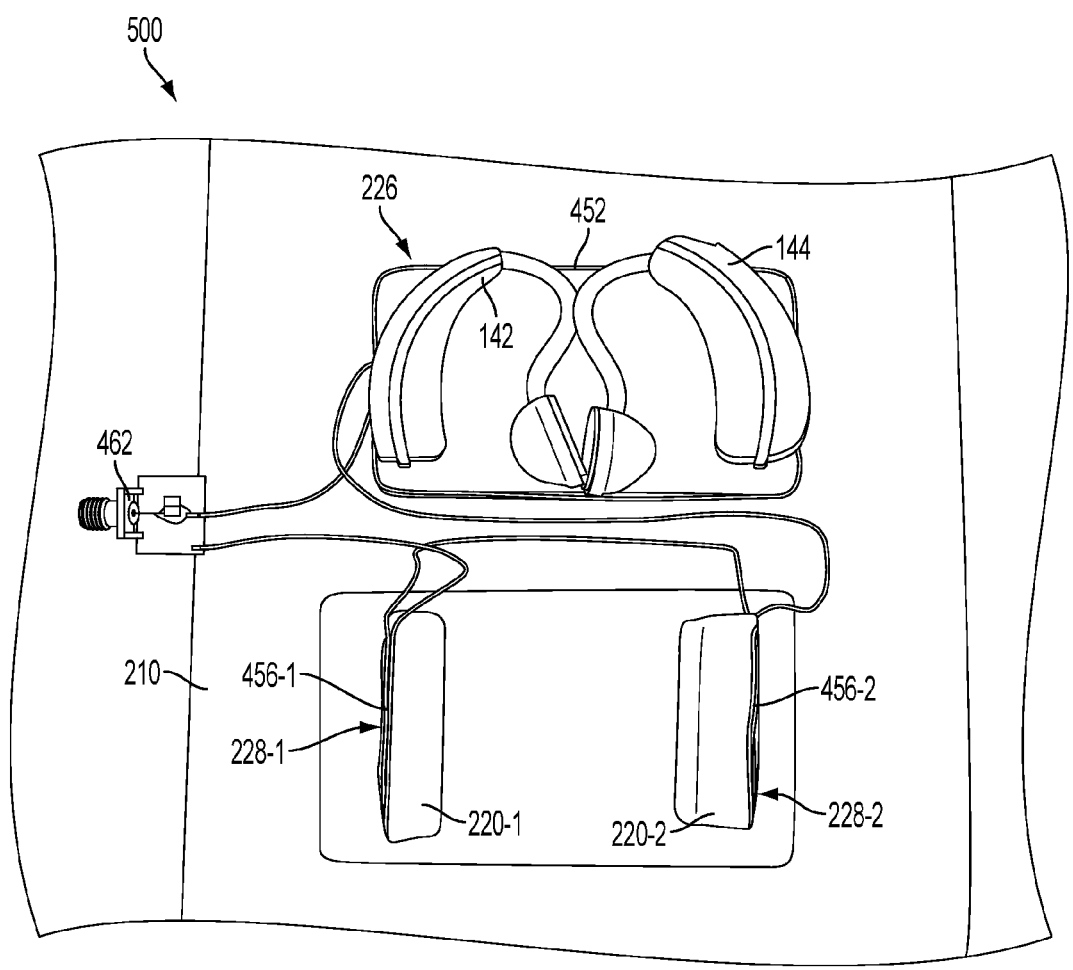
FIG. 5 is a schematic diagram illustrating an alternative embodiment of the wireless charger of FIG. 3.

FIG. 5 is a schematic diagram 500 illustrating an alternative embodiment of the wireless charger of FIG. 3. The wireless charger 500 comprises an antenna 226 that is implemented as a cylindrical coil 452 and antennas 228 (228-1 and 228-2) that are implemented as a planar coils 456-1 and 456-2. The design of each antenna 226, 228-1 and 228-2 comprises multiple-turn coils, which are all connected in series to provide higher efficiency for charging devices.

In an embodiment, the cylindrical coil 452 comprises five turns of 26 AWG wire. The planar coils 456-1 and 456-2 can comprise five turns of 26 AWG wire and are located in a plane that is orthogonal to the plane in which the cylindrical coil 452 is located. In an embodiment, the area of the planar coil 452 is approximately 45 mm×75 mm and the area of each planar coil 456-1 and 456-2 is approximately 35 mm×40 mm.

A connector and circuit 462 supplies RF charging energy to the antennas 226, 228-1 and 228-2. In an embodiment, the cylindrical coil 452 can be used to charge one or more ear-worn devices 142 and 144 and the planar coils 456-1 and 456-2 can be used to charge wrist-worn devices (not shown). In such an application, an antenna coil associated with a wrist-worn device can be located on the strap of the wrist-worn device allowing either coil 456-1 or 456-2 to charge the power source of the wrist-worn device, depending on the orientation of the wrist-worn device with respect to the coils 456-1 and 456-2.

Figure 6:
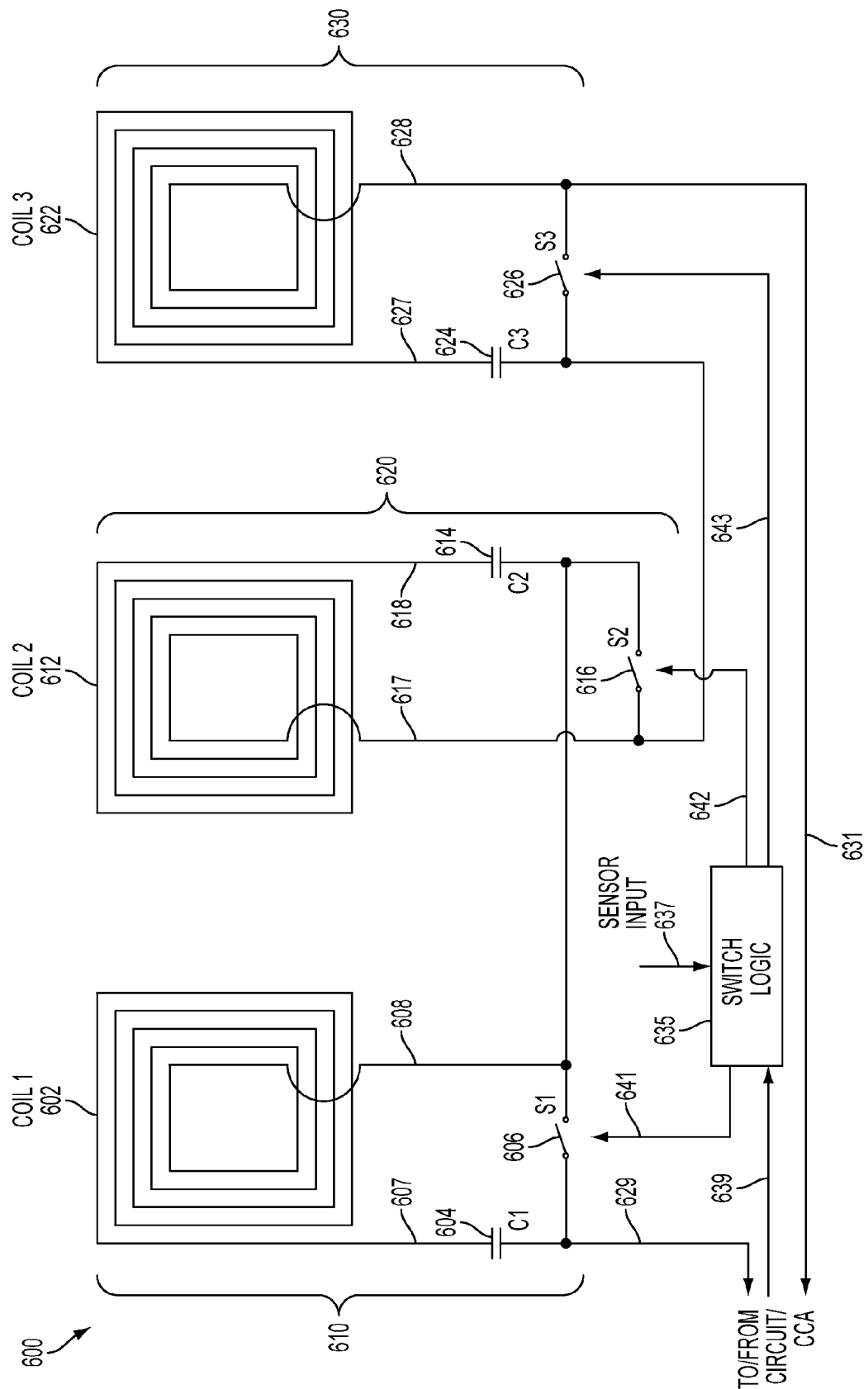
FIG. 6 is a schematic diagram illustrating an alternative embodiment of an arrangement of the coils described above.

FIG. 6 is a schematic diagram illustrating an alternative embodiment of an arrangement of the coils described above. The diagram shown in FIG. 6 can be implemented with any combination of cylindrical coils and/or planar coils, as described above. The circuit arrangement 600 includes coils 602, 612 and 622; capacitors 604, 614 and 624; and switches 606, 616 and 626. In an embodiment, the capacitor 604 and switch 606 are associated with the coil 602; the capacitor 614 and switch 616 are associated with the coil 612; and the capacitor 624 and switch 626 are associated with the coil 622. Three coils 602, 612 and 622 are shown for simplicity. Any number of coils can be implemented, depending on the design of the charger. In an embodiment, a coil, a capacitor and a switch form a charging structure. The coil 602, the capacitor 604 and the switch 606 form a charging structure 610. The coil 612, the capacitor 614 and the switch 616 form a charging structure 620. The coil 622, the capacitor 624 and the switch 626 form a charging structure 630.

A number of such charging structures are configured to charge a number of charge-receiving devices. In an embodiment where each charging structure is configured to charge a single charge-receiving device, the number of charge-receiving devices can be any number equal to or less than the number of charging structures. In an embodiment where each charging structure is configured to charge more than one charge-receiving device, the number of charge-receiving devices can be any number equal to, greater than, or less than the number of charging structures.

In an embodiment, the capacitor 604 is electrically matched to the coil 602, the capacitor 614 is electrically matched to the coil 612 and the capacitor 624 is electrically matched to the coil 622. Electrically matching a capacitor to a respective coil maximizes the transfer of charging energy by matching impedance and inductance of the circuit/CCA (not shown in FIG. 6) to the respective coil.

A conductor 629 is coupled to the capacitor 604 and to the switch 606; and a conductor 631 is coupled to the coil 622 and the switch 626. The conductors 629 and 631 are coupled to any of the circuits 162, 262, 362 or 462; and/or the circuit card assemblies 164 and/or 264, depending on the particular implementation.

In some implementations, it might be desirable to enable fewer than all of the available charging structures. Having multiple independently switched coils improves the charging efficiency when charging fewer than the maximum number of charge-receiving devices using fewer than all of the available charging structures.

In the embodiment shown in FIG. 6, each of the switches 606, 616 and 626, can be selectively controlled to selectively bypass its respective associated capacitor and coil. For example, when the switch 606 is closed, the coil 602 and the capacitor 604 are bypassed. Similarly, when the switch 616 is closed, the coil 612 and the capacitor 614 are bypassed. Similarly, when the switch 626 is closed, the coil 622 and the capacitor 624 are bypassed. In this manner, by selectively controlling the switches 606, 616 and 626 to be in an open (non-conductive) state or a closed (conductive) state, the coils 602, 612 and 622 can be switched into and out of the circuit 600, thereby allowing maximum efficiency, whether enabling any or all of the charging structures 610, 620 and 630, to charge one, two, or three charge-receiving devices. This ability to selectively bypass any number of coils 602, 612 and 622 is desirable because when charging fewer than the maximum number of charge-receiving devices, it is desirable to bypass any coil that does not have a charge-receiving device.

The switches 606, 616 and 626 can be implemented using a number of methodologies such as, for example only, semiconductor-based switches such as transistors. Switch logic 635 can include hardware, software, a combination of hardware and software, or any other logic for controlling the operation and the state of the switches 606, 616 and 626. The switch logic 635 can also be provided with one or more sensor input signals, for example, over connection 637 regarding whether a charge-receiving device is placed in proximity to any of the coils 602, 612 and 622 so that the state of the switches 606, 616 and 626 can be controlled, at least in part, by whether a charge-receiving device is located near or proximate to a coil. Such sensor or proximity determination technology is known to those skilled in the art. The switch logic 635 may also receive a power and/or logic signal from the circuit/CCA over connection 639, and provides switch control signals to switches 606, 616 and 626 over respective connections 641, 642 and 643.

As an example, if it is desirable to enable the three charging structures 610, 620 and 630 to charge at least three charge-receiving devices, for example, one charge-receiving device located proximate to each coil 602, 612 and 622, then each of the switches 606, 616 and 626 will be controlled to be placed in an open (non-conductive) state. Having each of the switches 606, 616 and 626 in an open state allows current provided by the circuit or circuit card assembly described above to flow through the conductors 629 and 631, and through each of the respective capacitors 604, 614 and 624 and associated coils 602, 612 and 622.

However, when it is desired to enable fewer than the maximum number of charging structures to charge fewer than the at least three charge-receiving devices, then each of the switches 606, 616 and 626 can be selectively enabled to be in either a closed (conductive) state or in an open (non-conductive) state. Having a switch in an open (non-conductive) state allows charging energy to flow through the associated coil. Having a switch in a closed (conductive) state prevents charging energy from flowing through the associated coil.

For example, if it is desired to enable the coil 602 to charge at least one charge-receiving device, then the switch 606 will be set in an open (non-conductive) state, while the switches 616 and 626 are controlled to be placed in a closed (conductive) state. In this manner, charging current will flow through the conductor 629, across the capacitor 604, through the conductor 607, through the coil 602, through the conductor 608, and through the closed switches 616 and 626, and through the conductor 631, thus bypassing the coils 612 and 622.

Similarly, if, for example it is desirable to enable the coil 602 and the coil 612 to charge at least two charge-receiving devices, then, switches 606 and 616 will be controlled to be placed in an open (non-conductive) state, while the switch 626 will be controlled to be placed in a closed (conductive) state. In this manner, charging current will flow through the coil 602 as described above, and then, because the switch 616 is open (non-conductive), the current will flow through the capacitor 614, through the conductor 618, through the coil 612, through the conductor 617, and then through the closed switch 626 to the conductor 631, thus bypassing the coil 622 and the capacitor 624.

In this manner, any of the switches 606, 616 in 626, can be selectively opened or closed so as to control the current flow through the charging structures 610, 620 and 630. Having the ability to control the flow of charging current through the switched coils improves the charging efficiency when using the charging structures 610, 620 and 630 to charge fewer than the at least three charge-receiving devices.

Figure 7:
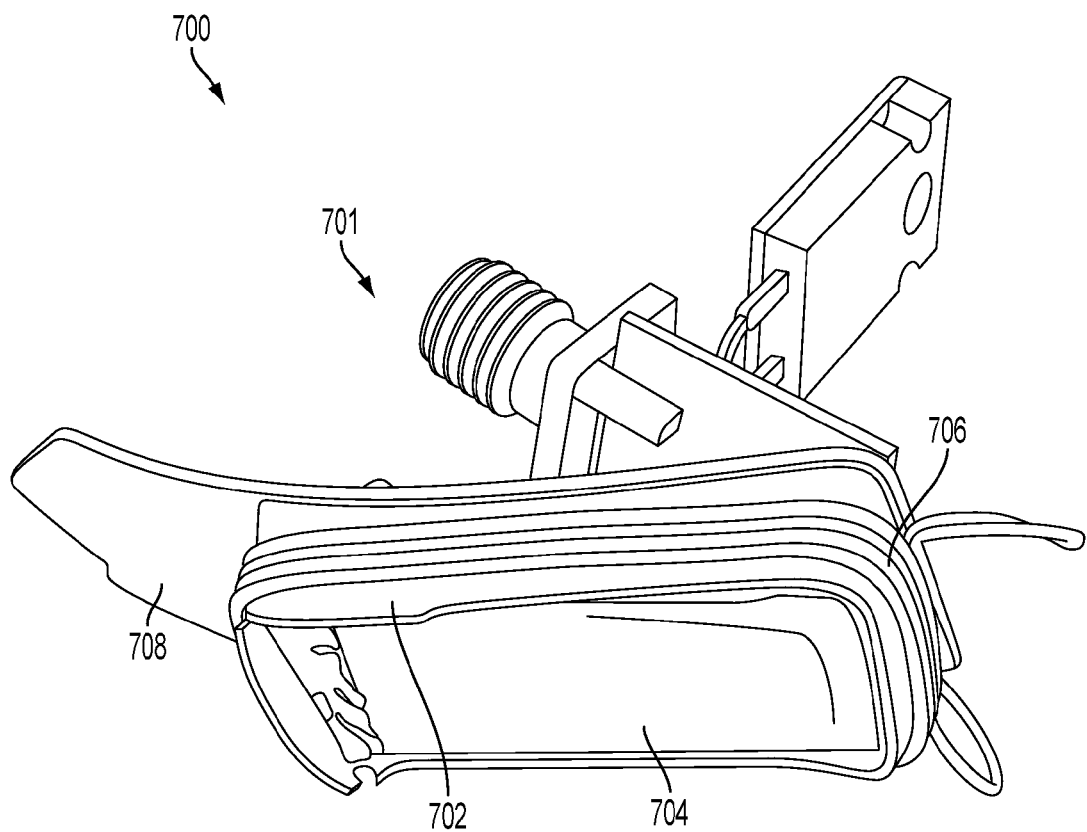
FIG. 7 is a schematic diagram illustrating a device to be charged.

FIG. 7 is a schematic diagram 700 illustrating a device to be charged. In the embodiment shown in FIG. 7, the device is an ear-worn device, such as an earpiece 701. In an embodiment, the earpiece 701 comprises magnetic material 702 surrounding a rechargeable power source, such as a rechargeable battery 704. An antenna 706 surrounds the magnetic material 702 and the battery 704. The antenna 706 and the battery 704 are electrically coupled to the circuit card assembly 708 such that charging energy received by the antenna 706 is transferred via the circuit card assembly 708 to the battery 704. The magnetic material 702 can be a ferrite that has a high magnetic permeability and helps to mitigate any reduction of the magnetic field coupling between the charger's coil (not shown in FIG. 7) and the ear-worn device's coil antenna 706 in the presence of metal material, such as the battery 704, the circuit card assembly 708 and other metallic material on the earpiece 701.

In an embodiment, the antenna 706 is implemented as a cylindrical coil comprising five turns of 30 AWG wire that is wrapped around and adhered directly to the battery 704. The antenna is wired from an edge of a top surface of the battery 704 to increase the separation between the antenna 704 and the circuit card assembly 708. In an embodiment, the magnetic material 702 can have a thickness of approximately 0.375 mm and can be obtained from Panasonic Corporation using part number KNZFACA37QLO.

In an embodiment, a ratio of the area of the antenna associated with any of the first, second and third charging areas described above and the antenna associated with the charge-receiving device ranges from approximately two-to-one to seven-to-one.

Figure 8:
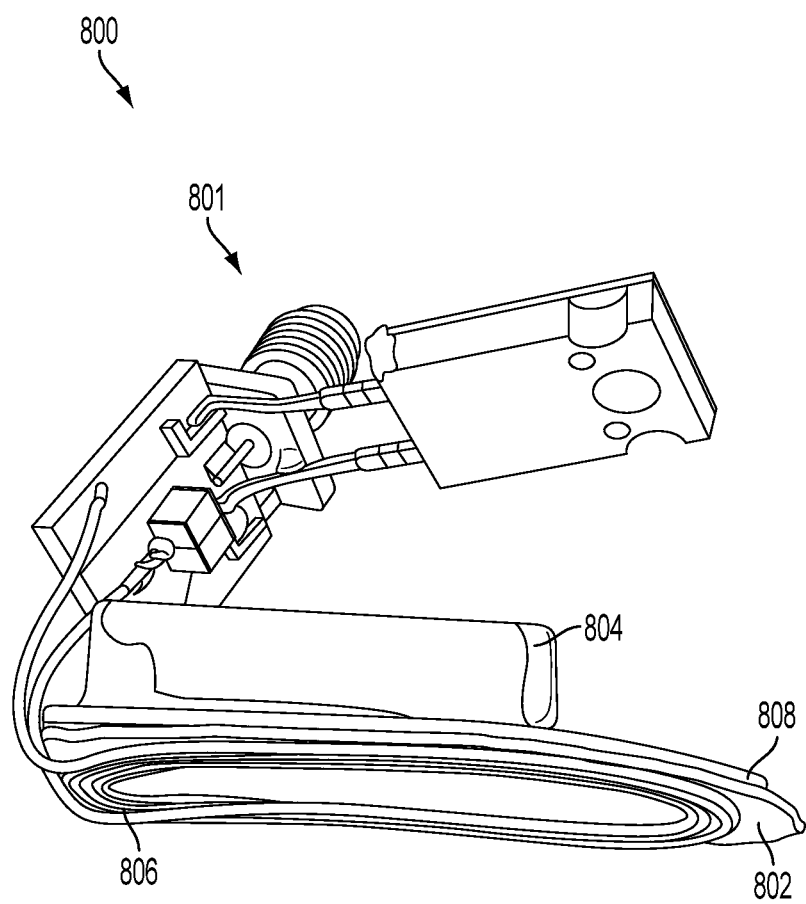
FIG. 8 is a schematic diagram illustrating an alternative embodiment of a device to be charged.

FIG. 8 is a schematic diagram 800 illustrating an alternative embodiment of a device to be charged. In the embodiment shown in FIG. 8, the device is an ear-worn device, such as an earpiece 801. In FIG. 8, the antenna 806 is implemented as a planar coil that is located adjacent magnetic material 802, which is located adjacent the circuit card assembly 808. The battery 804 is located adjacent the circuit card assembly 808 and is adapted to receive RF charging energy from the antenna 806.

In an embodiment, the antenna 806 is implemented as a planar coil comprising five turns of 30 AWG wire that is located adjacent the magnetic material 802, which is adhered to the battery 804. The antenna 806 is located on a surface of the magnetic material 802 that is opposite the battery 804. In an embodiment, the magnetic material 802 can have a thickness of approximately 0.375 mm and can be obtained from Panasonic Corporation using part number KNZFACA37QLO.

In alternative embodiments, the antenna 706 (FIG. 7) and the antenna 806 (FIG. 8) may be implemented as a printed structure, such as a printed coil formed on a flexible film.

Figure 9:
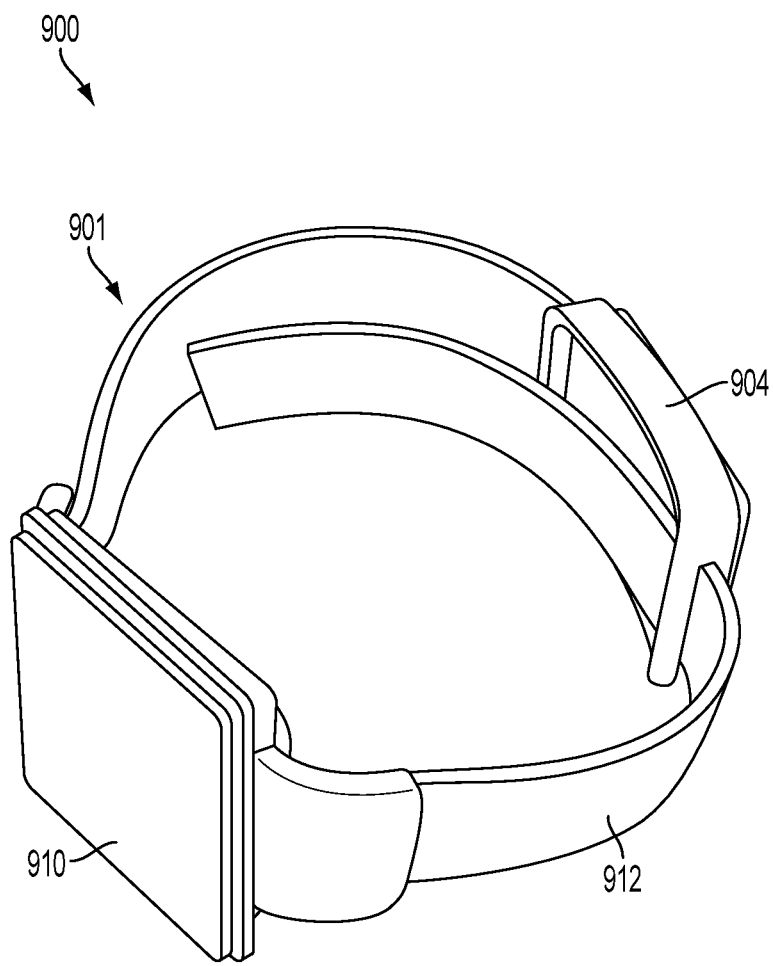
FIG. 9 is a schematic diagram illustrating a device to be charged.

FIG. 9 is a schematic diagram 900 illustrating a device to be charged. In the embodiment shown in FIG. 9, the device is a wrist-worn device, such as a wristwatch 901. Alternative embodiments of the wrist-worn device include, but are not limited to, a display for a personal hub, a wrist-worn communication device such as a portable cellular-type telephone, or another device. In the embodiment shown in FIG. 9, the wristwatch 901 comprises a body 910, a bracelet or strap 912 and a battery 904. In this embodiment, the battery 904 is located remote from the body 910 to reduce the thickness of the body 910. However, in alternative embodiments, the battery 904 may be located adjacent the body 910, or at another location on the bracelet 912.

FIGS. 10A through 10D are schematic diagrams illustrating non-limiting embodiments of the wrist-worn device of FIG. 9. The embodiments shown in FIGS. 10A through 10D illustrate different possible locations and configurations of a charge energy receiving antenna on a device to be charged by the wireless charger described above. For example, and as described above, the antenna can be fabricated using conductive material, such as copper wire, to form a multiple-turn conductive coil into a cylindrical shape or into a planar shape or may be implemented as a printed structure, such as a printed coil formed on a flexible film. As non-limiting examples, the antenna can be a planar coil located on the back of a wrist-worn device, a planar coil located inside of the bracelet of the wrist-worn device, a planar coil located adjacent a battery, a planar coil located on the front of the wrist-worn device, a cylindrical coil located around the perimeter of the wrist-worn device, and a cylindrical coil wrapped around the battery of the wrist-worn device. Alternatively, the antenna can be a planar printed coil fabricated using a conductive flexible material located as described above to reduce the thickness of the antenna.

Figure 10A:
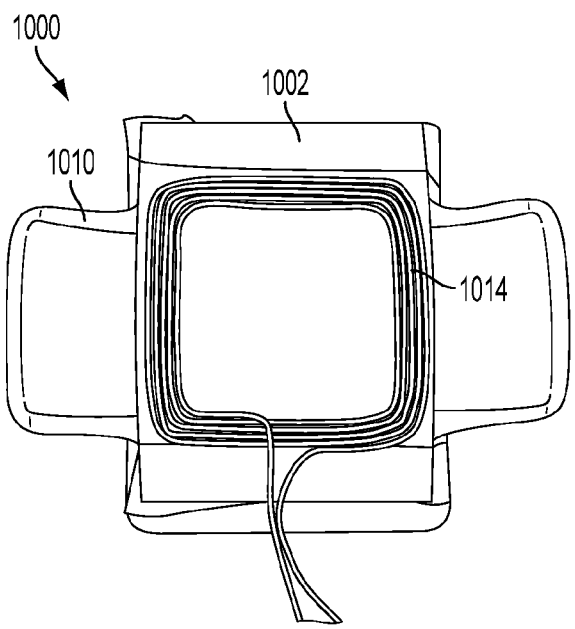
FIGS. 10A through 10D are schematic diagrams illustrating different example embodiments of the wrist-worn device of FIG. 9.

In the embodiment shown in FIG. 10A, an antenna 1014 is implemented as a planar coil that is located adjacent the rear of the body 1010 of a wrist-worn device. A magnetic material 1002 is located between the antenna 1014 and the rear of the body 1010. The magnetic material 1002 can be a ferrite that has a high magnetic permeability and helps to mitigate any reduction of the magnetic field coupling between the charger's coil (not shown in FIG. 10A) and the wrist-worn device's antenna 1014 in the presence of metal material, such as the battery 904, a circuit card assembly and other metallic material on the wrist-worn device.

Figure 10B:
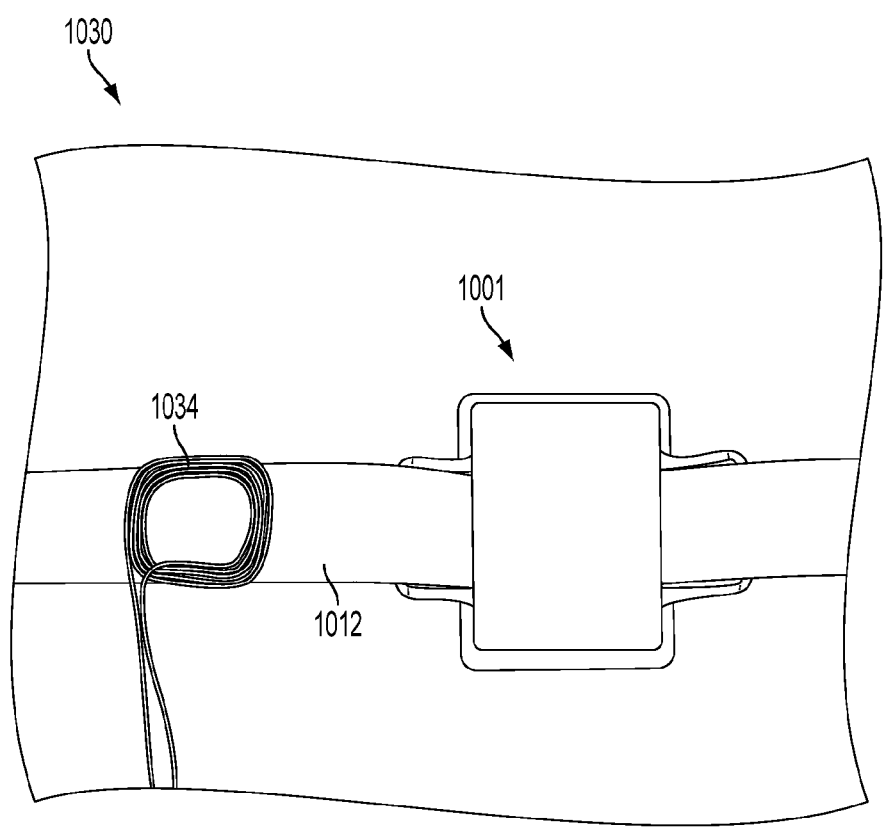

In the embodiment shown in FIG. 10B, an antenna 1034 is implemented as a planar coil that is located adjacent the bracelet 1012 of a wrist-worn device 1001.

Figure 10C:
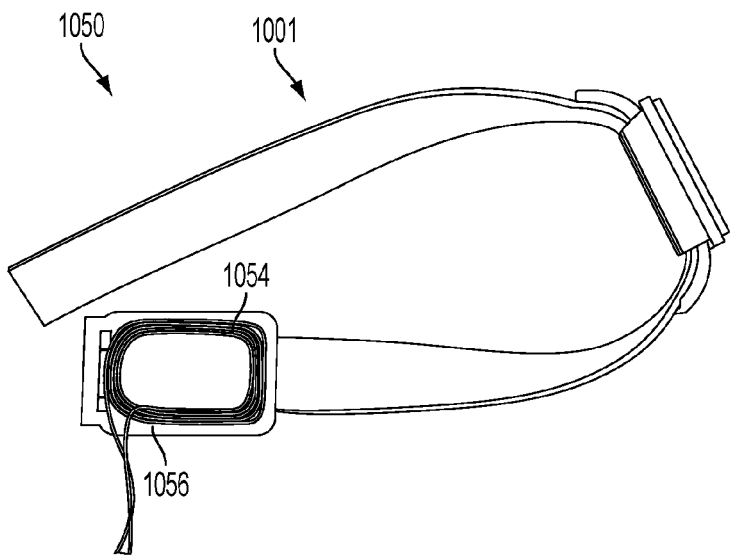

In the embodiment shown in FIG. 10C, an antenna 1054 is implemented as a planar coil that is located adjacent the battery 1056 of a wrist-worn device 1001.

Figure 10D:
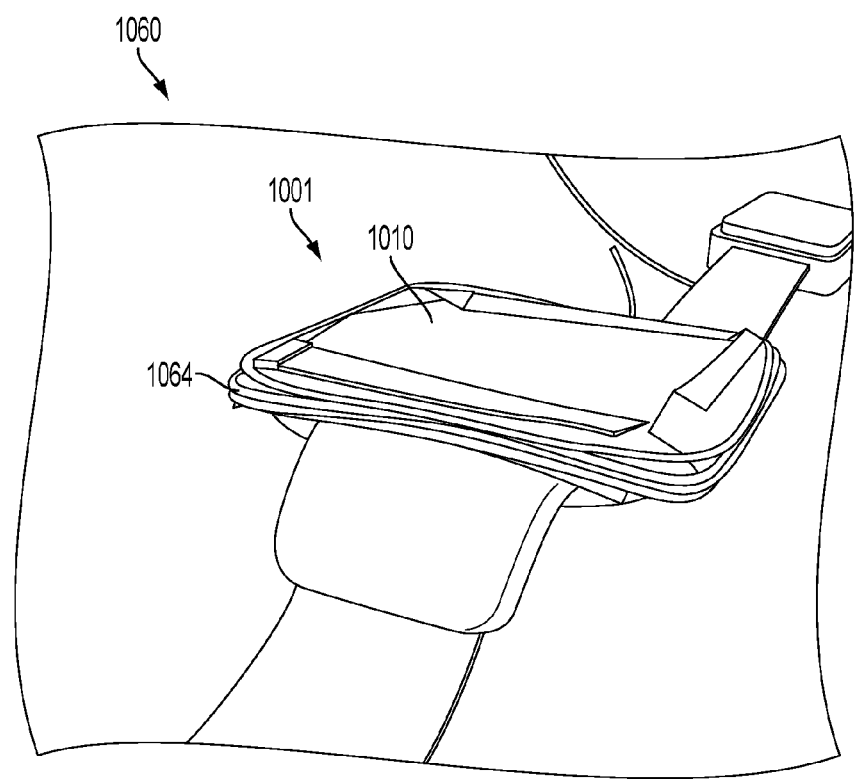

In the embodiment shown in FIG. 10D, an antenna 1064 is implemented as a cylindrical coil that is located around the body 1010 of the wrist-worn device 1001.

Further, an antenna can be located on a front of the wrist-worn device, as a cylindrical coil wrapped around the battery, or any other configuration.

FIG. 11 is a schematic diagram 1100 illustrating an embodiment of a portion of the wireless charger of FIG. 1A. A portion of the first charger portion 110 comprises a recess 1102 into which a device to be charged, such as an ear-worn device 142 shown in dotted line for reference, can be located. In an embodiment, a cylindrical antenna 1124, illustrated in cross-section, can be fabricated as described above and located around a periphery of the recess 1102. Such a configuration increases the amount of charging energy that can be transferred from the antenna 1124 to the device to the ear-worn device 142.

Figure 12:
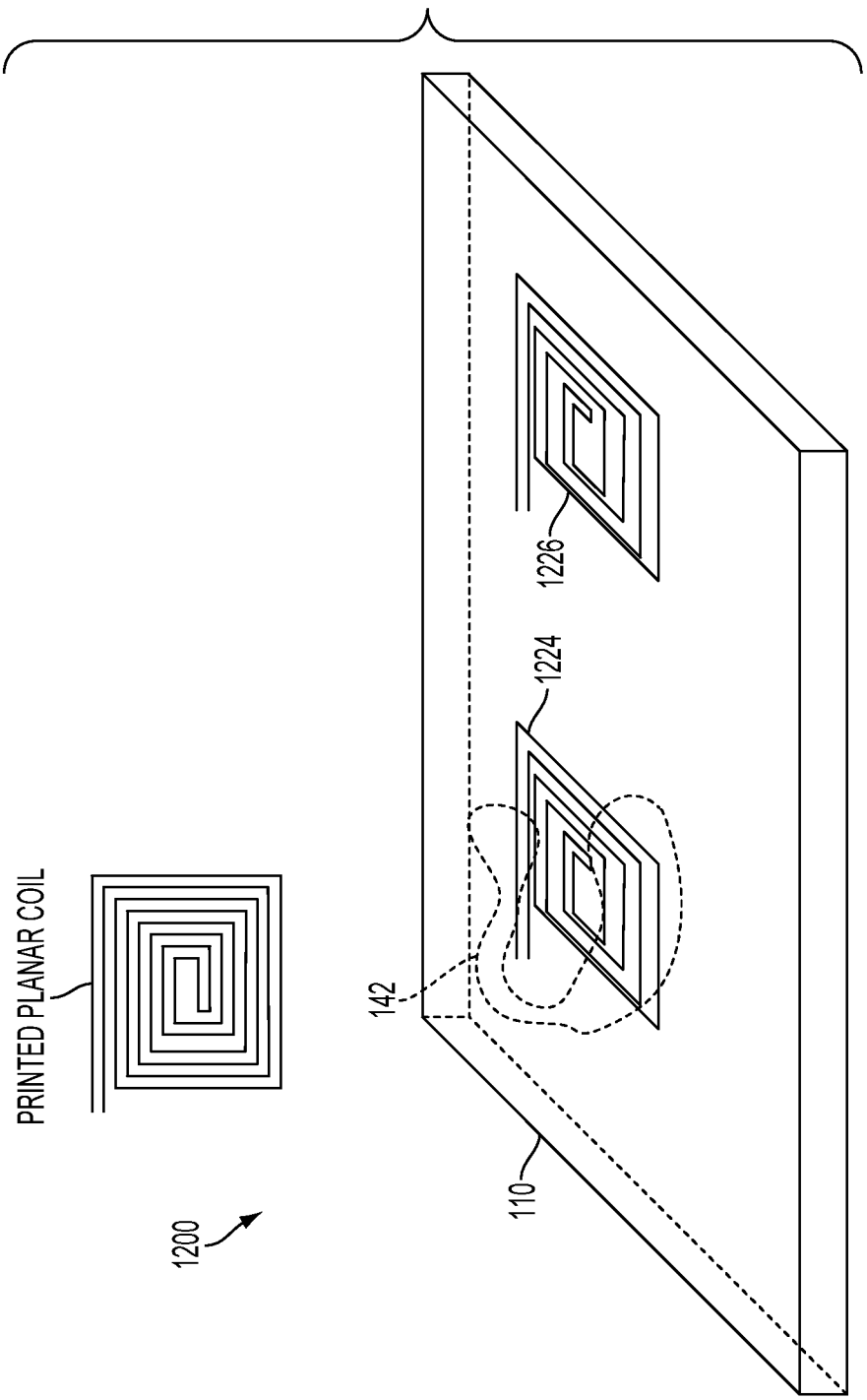
FIG. 12 is a schematic diagram illustrating an alternative embodiment of a portion of the wireless charger of FIG. 1A.

FIG. 12 is a schematic diagram 1200 illustrating an alternative embodiment of a portion of the wireless charger of FIG. 1A. A portion of the first charger portion 110 comprises antennas 1224 and 1226 implemented as printed planar coils. An ear-worn device 142 is shown in dotted line for reference. The printed planar coils can be fabricated using a conductive flexible or non-flexible material located as described above to reduce the thickness of the antenna.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus for wireless charging using radio frequency (RF) energy, comprising:
a first charger portion having first and second charging areas, the first and second charging areas located in a common plane, the first and second charging areas each occupying a different respective region in the common plane, the first and second charging areas each being at least partly enclosed by a respective frame to define an interior, the first and second charging areas each having at least one coil wound around the interior for wirelessly charging a charge-receiving device placed in the interior of the first or second charging area, the at least one coil in each of the first and second charging areas comprising a respective winding including a plurality of turns in the common plane extending in a radial direction from a coil axis, the winding of the coil in the first charging area being wound in a direction opposite that of the winding of the coil in the second charging area, each coil being connected in series by an innermost turn of the coil in the first charging area being electrically coupled to an outermost turn of the coil in the second charging area, each coil configured to charge at least one charge-receiving device; and
a second charger portion having a third charging area, the third charging area having at least one coil comprising a winding for wirelessly charging a charge-receiving device placed in proximity to the third charging area, the coil in the third charging area being connected in series with the coils in the first and second charging areas, the third charging area located in a plane that is orthogonal to the plane of the first and second charging areas.

2. The apparatus of claim 1, wherein each coil is configured to charge a plurality of charge-receiving devices.

3. The apparatus of claim 1, further comprising a charge-receiving device placed in non-specific alignment proximity to any of the first, second and third charging areas, wherein the first and second charging areas are adapted to receive an ear-worn charge-receiving device and the third charging area is adapted to receive a wrist-worn charge-receiving device.

4. The apparatus of claim 1, wherein charging energy is transferred at a frequency of approximately 6.78 MHz.

5. The apparatus of claim 1, wherein a ratio of the area of the coil associated with any of the first, second and third charging areas and an antenna coil associated with the charge-receiving device ranges from approximately two-to-one to seven-to-one.

6. The apparatus of claim 1, wherein the coil is chosen from a cylindrical coil, a planar coil and a printed coil.

7. The apparatus of claim 6, wherein the printed coil is formed on a flexible film.

8. The apparatus of claim 1, further comprising a recess formed in any of the first charger portion and the second charger portion and wherein the antenna coil is configured as a cylindrical coil disposed about a periphery of the recess, the recess configured to receive a charge-receiving device.

9. The apparatus of claim 1, further comprising a switch and a capacitor associated with each coil, the switch being selectively operable such that when in a conductive state, the switch prevents the associated coil from receiving current to generate charging energy.

10. The apparatus of claim 9, wherein a switch, a capacitor and a coil form a charging structure and a plurality of charging structures are selectively operable such that when in a conductive state, each respective switch prevents the associated coil from generating charging energy.

11. The apparatus of claim 10, wherein a plurality of charging structures are configured to charge a number of charge-receiving devices, the number of charge-receiving devices being any number equal to, greater than or less than the number of charging structures.

* * * * *